US010067689B1

(12) United States Patent
Ying et al.

(10) Patent No.: US 10,067,689 B1
(45) Date of Patent: Sep. 4, 2018

(54) METHOD AND APPARATUS FOR HIGH BANDWIDTH MEMORY READ AND WRITE DATA PATH TRAINING

(71) Applicant: Cadence Design Systems, Inc., San Jose, CA (US)

(72) Inventors: Guangxi Ying, Beijing (CN); Zhehong Qian, Shanghai (CN); Xiaobo Zhang, Beijing (CN); Yanjuan Zhan, Beijing (CN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 29 days.

(21) Appl. No.: 15/250,740

(22) Filed: Aug. 29, 2016

(51) Int. Cl.
*G06F 3/06* (2006.01)

(52) U.S. Cl.
CPC .......... *G06F 3/0613* (2013.01); *G06F 3/0635* (2013.01); *G06F 3/0658* (2013.01); *G06F 3/0673* (2013.01)

(58) Field of Classification Search
CPC .................................. G11C 5/063; G11C 7/22
See application file for complete search history.

(56) References Cited

U.S. PATENT DOCUMENTS

| | | | |
|---|---|---|---|
| 6,316,980 B1 | 11/2001 | Vogt et al. | |
| 6,442,102 B1 | 8/2002 | Borkenhagen et al. | |
| 7,558,132 B2 | 7/2009 | Carnevale et al. | |
| 7,594,750 B2 | 9/2009 | Lee et al. | |
| 9,910,623 B2 * | 3/2018 | Yang | G06F 3/0671 |
| 2007/0233942 A1 | 10/2007 | Huang | |
| 2010/0014364 A1 * | 1/2010 | Laberge | G11C 5/02 365/193 |
| 2010/0325372 A1 * | 12/2010 | Housty | G06F 13/1684 711/154 |
| 2014/0089573 A1 * | 3/2014 | Sakthikumar | G06F 13/1689 711/105 |
| 2015/0113235 A1 * | 4/2015 | Morris | G06F 13/1689 711/154 |
| 2016/0069957 A1 | 3/2016 | Whetsel | |
| 2017/0162276 A1 * | 6/2017 | Ok | G11C 29/38 |
| 2017/0270994 A1 * | 9/2017 | Glancy | G11C 11/4076 |

OTHER PUBLICATIONS

Devendra Rai et al., "A Calibration Based Thermal Modeling Technique for Complex Multicore Systems", 2015 Design, Automation & Test in Europe Conference & Exhibition, 2015, pp. 1138-1143.

(Continued)

*Primary Examiner* — Edward J Dudek, Jr.
(74) *Attorney, Agent, or Firm* — Foley & Lardner LLP

(57) ABSTRACT

According to certain general aspects, the present embodiments relate to methods and apparatuses for performing read and write data path training in HBMs. In accordance with some aspects, embodiments configure HBM mode registers for read and write data path training using an IEEE 1500 interface is simpler than the traditional scenario. In accordance with other aspects, the logic for performing read and write data path training is independent from normal memory access functionality in the host, capable of independently interacting with a PHY core for performing read and write data path training.

20 Claims, 4 Drawing Sheets

(56) References Cited

OTHER PUBLICATIONS

Ho Joon Lee et al., "A Process Tolerant Semi-Self Impedance Calibration Method for LPDDR4 Memory Controller", IEEE 58th International Midwest Symposium on Circuit and Systems (MWSCAS), Aug. 2015, 4 pages.
Munkyo Seo et al., "A Blind Calibration Technique to Correct Memory Errors in Amplifier-Sharing Pipelined ADCs", IEEE International Symposium on Circuit and Systems, 2007, pp. 3610-3613.
Yong-Cheol Bae et al., "A 1.2V 30nm 1.6Gb/s/pin 4Gb LPDDR3 SDRAM with Input Skew Calibration and Enhanced Control Scheme", 2012 IEEE International Solid-State Circuits Conference, 3 pages.

* cited by examiner

METHOD AND APPARATUS FOR HIGH BANDWIDTH MEMORY READ AND WRITE DATA PATH TRAINING

TECHNICAL FIELD

The present embodiments relate generally to computer memories, and more particularly to techniques and devices for performing write and read data path training for high bandwidth memories.

BACKGROUND

High Bandwidth Memory (HBM) is a high-performance RAM interface for 3D-stacked dynamic random access memories (DRAMs), intended for applications such as high-performance graphics accelerators and network devices (see, e.g., "High Bandwidth Memory (HBM) DRAM (JESD235)," JEDEC, October 2013). HBM achieves higher bandwidth while using less power in a substantially smaller form factor than DDR4 or GDDR5 by stacking up to eight DRAM dies. The HBM memory bus is also very wide in comparison to other DRAM memories such as DDR4 or GDDR5. For example, an HBM stack of four DRAM dies has two 128-bit channels per die for a total of eight channels and a width of 1024 bits in total, with each channel interface operating at DDR data rates. A chip with four such stacks would therefore have a memory bus with a width of 4096 bits. In comparison, the bus width of GDDR memories is 32 bits, with 16 channels for a graphics card with a 512-bit memory interface. The second generation of high bandwidth memory, HBM 2, specifies up to 8 dies per staple and doubles throughput to 1 TB/s. In summary, the HBM DRAM uses a wide-interface architecture to achieve high-speed, low-power operation.

Although much higher in performance, HBM includes many of the same features of DDR, including the need for read and write data path training. The purpose of read and write data path training is to identify the delay at which the read and write DQS rising edges align with the beginning and end transitions of the associated DQ data eye. By identifying these delays, the system can calculate the midpoint between the delays, then align the read/write DQS to the accurate centers of the read/write DQ data eye.

There are many conventional approaches to performing read and write data path training for DDR memories. See, e.g., Yong-Cheol Bae, Joon-Young Park et al., "A 1.2V 30 nm 1.6 Gb/s/pin 4 Gb LPDDR3 SDRAM with Input Skew Calibration and Enhanced Control Scheme," ISSCC Dig. Tech. Papers, pp. 44-46, February 2012; Munkyo Seo, Sopan Joshi, Ian A. Young, "A Blind Calibration Technique to Correct Memory Errors in Amplifier-sharing Pipelined ADCs," IEEE International Symposium on Circuit and Systems, 2007; Devendra Rai, Lothar Thiele, "A Calibration Based Thermal Modeling Technique for Complex Multicore Systems," Design, Automation & Test in Europe Conference & Exhibition (DATE), 2015, pp. 1138-1143, March 2015; Ho Joon Lee, Yong-Bin Kim, "A Process Tolerant Semi-Self Impedance Calibration Method for LPDDR4 Memory Controller," IEEE 58th International Midwest Symposium on Circuit and Systems (MWSCAS), pp. 1-4, August 2015; U.S. Pat. No. 6,316,980 to Pete D. Vogt et al. titled "Calibrating Data Strobe Signal Using Adjustable Delays with Feedback"; U.S. Pat. No. 7,558,132 to Michael Joseph Carneval et al. titled "Implementing Calibration of DQS Sampling During Synchronous DRAM READs"; U.S. Pat. No. 6,442,102 to John Michail Borkenhagen et al, titled "Method and Apparatus for Implementing High Speed DDR SDRAM Read Interface with Reduced ACLV effects"; U.S. Patent Publ. No. 2007/0233942 to Hsiang-I Huang et al. titled "Method for Calibration of Memory Devices, and Apparatus Thereof"; and U.S. Pat. No. 7,594,750 to Seung-Hoon Lee et al. titled "Method for Outputting Internal Temperature Data in Semiconductor Memory Device and Circuit of Outputting Internal Temperature Date Thereby."

However, challenges can arise when attempting to implement these conventional DDR training schemes in HBMs. None of these references recognize or address these challenges.

SUMMARY

According to certain general aspects, the present embodiments relate to methods and apparatuses for performing read and write data path training in HBMs. In accordance with some aspects, embodiments configure HBM mode registers for read and write data path training using an IEEE 1500 interface is simpler than the traditional scenario. In accordance with other aspects, the logic for performing read and write data path training is independent from normal memory access functionality in the host, capable of independently interacting with a PHY core for performing read and write data path training.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION OF THE PREFERRED EMBODIMENTS

The present embodiments will now be described in detail with reference to the drawings, which are provided as illustrative examples of the embodiments so as to enable those skilled in the art to practice the invention. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present applicants have recognized that certain challenges can arise from attempting to apply conventional DDR and other approaches to read and write data path training in HBMs. According to these and other aspects, the present embodiments address and solve these and other challenges.

Figure 1:
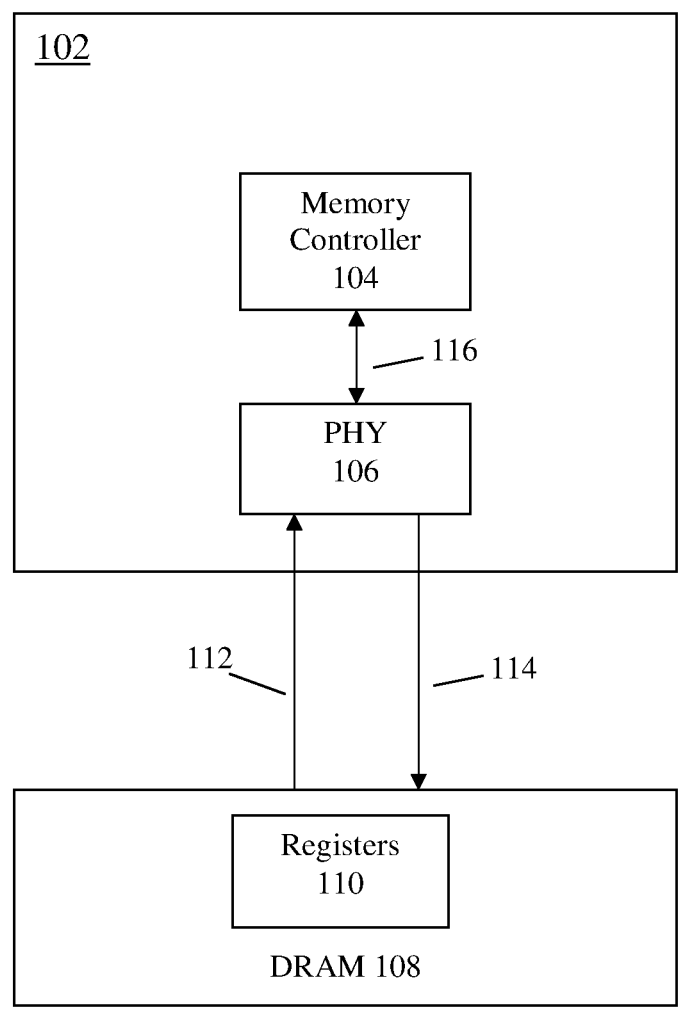
FIG. 1 is a block diagram illustrating aspects of conventional read and write data path training.

FIG. 1 is a block diagram illustrating aspects of conventional DDR and other approaches to read and write data path training in DRAMs.

As shown in FIG. 1, host 102 includes a memory controller 104 and PHY 106 for reading and writing host and other data from and to DRAM 108.

In connection with read data path training, in an example where DRAM 108 is a conventional DRAM such as DDR4, DDR3, LPDDR3 and LPDDR4, registers 110 in DRAM 108 are used to store patterns to be read out during training. Generally, controller 104 in host 102 writes these registers with one or several patterns, through defined commands issued via DDR PHY interface (DFI) 116 and PHY 106. Alternatively, the controller 104 uses default patterns in the registers. Either way, the controller 104 knows the patterns to be read out. Then the controller 104 sets DRAM 108 into a special mode, in which the data path is from the pattern registers 110 in DRAM 108 and to the host 102, through the read data interface 112 (DQS-DQ). The host 102 with PHY 106 can then adjust the delays between DQS and DQ according to the data received.

In connection with conventional write data path training, in an example where DRAM 108 is LPDDR4, read and write commands with user patterns are used during training. In particular, this command-based approach uses MPC commands with appropriate operands issued via DFI 116 to enable this special mode of operation. To perform write DQ training, memory controller 104 issues a MPC (i.e. Write) command followed immediately by a CAS-2 to initiate a Write FIFO command. MPC commands with user (i.e. memory controller 104) defined patterns may be issued to DRAM 108 to store up to 80 values (BL16×5) per DQ pin that can be read back via the MPC (i.e. Read FIFO) command. After writing data to DRAM 108 with the MPC (i.e. Write FIFO) command, and reading the data back with the MPC (i.e. Read FIFO) command, the results are compared with expected data to see if further training of write data path 114 is needed. The host 102 with PHY 106 can then adjust the delays between DQS and DQ according to the data received.

The present applicants have recognized several challenges that can arise when attempting to use the above and other conventional approaches when DRAM 108 is implemented by HBM.

For example, HBM DRAM can work at frequencies up to 1 GHz, with 128-bit DQ and 4-bit DQS. The 128-bits DQ may worsen the bit skew, so it may be difficult for the PHY to align the read and write DQS to the center of the valid data eye. Moreover, 32-bit data is sampled by DQS. This data width is four times wider than traditional DRAMs. Because of the bit skew, the common data eye for 32-bit DQ may also be more difficult for the PHY to find.

Still further, as set forth above, the traditional read data path training needs to set the related mode register before entering read training mode. Taking DDR4 for instance, the host needs to initiate a MRS command to set MR3.A2 in the DRAM's mode registers to 1, implying the DQ is from MPR. As further set forth above, the LPDDR4 write DQ training needs to use MPC WR FIFO commands to access write DQ training. So there is a condition that the host is able to generate MRS/MPC commands. And given the need to generate MRS/MPC sequences, the complexity of the module needed to perform training is increased.

Even further still, the present applicants recognize that it would be desirable if the logic for performing read and write data path training were independent of the normal functioning of the host, and working in an independent data path, capable of generating its own read and write command sequences with appropriate timing required by training.

Figure 2:
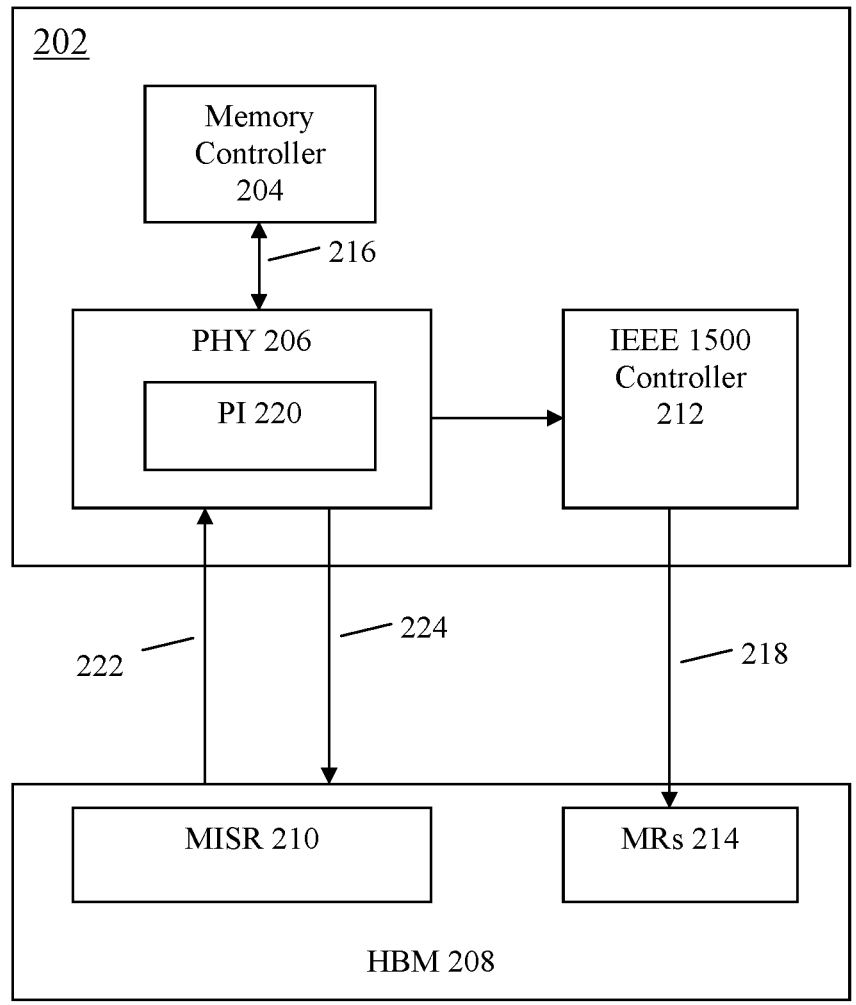
FIG. 2 is a block diagram illustrating example aspects of read and write data path training for HBMs according to the present embodiments.

FIG. 2 is a block diagram illustrating example aspects of read and write data path training in HBMs according to the present embodiments.

As shown, in this example, host 202 includes memory controller (MC) 204 (e.g. including read, write and command queues, transaction processing, error correction, etc., not shown), memory (e.g. DDR) PHY 206 having a PHY independent (PI) module 220 and PHY core (e.g. including data slices, address slices, clocks, delay lines, etc., not shown) and IEEE 1500 controller 212. These host components interface with HBM 208 via a command/address path (not shown), read data path 222, write data path 224 and IEEE 1500 interface 218. As further shown, MC 204 includes a DDR PHY interface (DFI) 216 with PHY 206.

PI module 220 is shown separately for underscoring the additional functionality provided by the present embodiments as will be described in more detail below. However, this is for ease of illustration and not limiting. In this regard, it should be noted that MC 204 and PHY 206 including a IEEE 1500 controller 212 and PHY core can be implemented using conventional HBM memory controllers, memory (e.g. DDR) PHYs and IEEE 1500 controllers, as adapted to interact with the functionality of PI module 220 as explained in more detail below. Those skilled in the art will be able to understand how to implement such adaptations after being taught by the present examples.

Host 202 can be a system on a chip or other set of one or more integrated circuits and can, but not necessarily, include many other components not shown in FIG. 2, such as CPUs, modems, memories, etc. It should be further noted that the principles of the present embodiments can be extended to IP representing the illustrated and other components of host 202. HBM 208 can be any conventional DRAM conforming to the HBM or HBM2 specification, as well as any backward-compatible specifications.

Data paths 222 and 224 are simplified for ease of illustration. However, they should include at least DQ and DQS signals and associated clocks. It should be noted that there may be many additional connections between host 202 and HBM 208 that are not shown in FIG. 2 as they are not necessary for an understanding of the present embodiments.

In general, MC 204 completes normal data accesses with HBM 208. PHY 206 transforms signals between DFI and the HBM interface. IEEE 1500 controller 212 connects the host 202 with the HBM's IEEE 1500 interface 218, and converts the defined commands from MC 204 to IEEE 1500 commands. PI module 220 controls the processes of performing read and write DQ training as will be explained in more detail below. Besides performing command and data transformations and transactions between HBM 208 and host DFI bus 216, the PHY core also adjusts the delay lines in accordance with read and write DQ training as in the conventional approaches.

As further illustrated in FIG. 2, the present applicants recognize several features of HBMs such as HBM 208 that can be exploited for performing read and write DQ (i.e. data path) training according to example embodiments.

First, the HBM specification requires HBM DRAMs to support IEEE standard 1500 and further defines some test instructions which are sent via an IEEE standard 1500 port in the HBM. Accordingly, there should be an IEEE interface controller in the host, independent of the existence of read and write data path training. Among other things, the present applicants recognize that the mode registers 214 in a HBM device can be configured through such an IEEE standard 1500 port, using specified command codes.

Moreover, in HBM devices, a Multiple-input Shift Register (MISR) circuit 210 is defined within the DWORD IO blocks. This circuit is intended for testing and training the read and write data paths 222 and 224 in loopback mode. During read data path training, after putting the HBM into loopback mode via its mode registers, the data read back for a READ command can be obtained from several sources, including the MISR. The MISR has a default value of 0xAAAAAh, which can be selected by setting mode register MR7 in the HBM device. In the conventional approaches described above, the host uses MRS commands to configure similar types of mode registers in non-LPDDR4 DRAMs before entering training mode.

Likewise, during write data path training, after putting the HBM into loopback mode via its mode registers, the host sends DWORD write cycles and the HBM clocks the raw received data into the DWORD MISR. Then the contents of the MISR can be read out to the host to compare with the data written. In the conventional approaches described above, in particular for LPDDR4 supporting write DQ training, the host uses performs write training (i.e. sending DWORD write and read cycles) using MPC commands.

According to certain aspects, in contrast to the conventional approaches, the present embodiments use the IEEE standard 1500 port in the HBM to configure the mode registers 214 to place the HBM device 208 to be trained into loopback mode, as needed for read and write data path training. In particular, in example embodiments, to perform read and write training, PI 220 communicates with IEEE 1500 controller 212 to configure mode registers 214 via IEEE 1500 interface 218. Because the IEEE 1500 interface can be used to read and write mode registers in a HBM device without using MRS commands, the logic required to implement PI 220 can be made more simple and compact than the logic required for the conventional approaches. Still further, the logic in PI 220 for performing read and write data path training according to the present embodiments is independent from the logic for performing other memory access functions in the host. As such, IP representing host 202 can be easily re-used to either include or not include PI 220.

Figure 3:
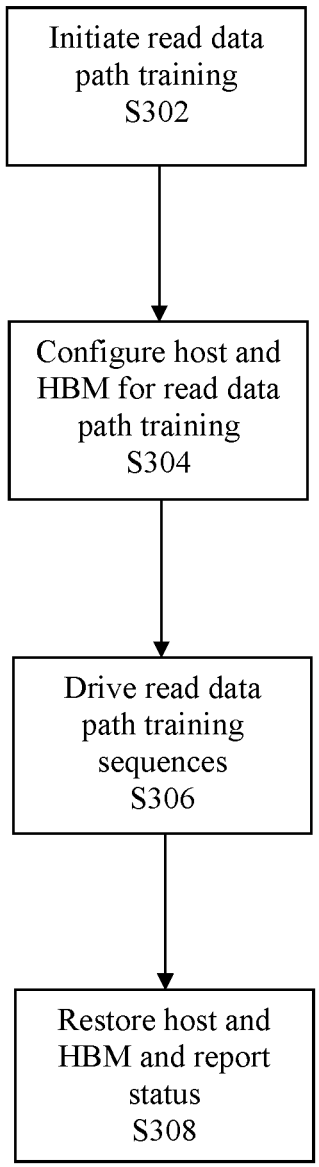
FIG. 3 is a flowchart illustrating an example methodology for performing read data path training for HBMs according to the present embodiments.

FIG. 3 is a flowchart illustrating aspects of an example read data path training methodology for HBMs according to the present embodiments.

In step S302, read data path training is initiated. For example, when host 202 needs read data path training (e.g. when host 202 boots and/or when MC 204 initiates a self-test), MC 204 enables PI 220, for example by setting a register in PI 220. Then PI 220 takes control of DFI 216 (e.g. by requesting control from MC 204). Before giving over control DFI 216, MC 204 places HBM 208 in self refresh state. PI 220 also requests control of the IEEE 1500 connection 218 from IEEE 1500 controller 212. After this control is acknowledged by controller 212, PI 220 kicks off read data path training.

In step S304, PI 220 sends a series of defined codes to IEEE 1500 controller 212 to cause controller 212 to configure the MR7 register in mode registers 214 via interface 218 so as to place HBM 208 into loopback mode.

Also included in step S304, PI 220 further instructs controller 212 to configure mode registers 214 via interface 218 to cause HBM 208 to enter DWORD read register mode and to use MISR registers 210 as the read data source, with a preset value of 0xAAAAAh. This solution is preferred because the alternative DWORD read LFSR mode is complex to be implemented when adapting the PHY core to perform read training, as is needed in the present embodiments. However, this alternative mode may be used in other embodiments.

In step S306, after read data path training configuration, PI 220 drives the DFI read training sequence as described above until the PHY core responds with a training success flag or a time out. More particularly, in response to DFI commands from PI 220, the PHY core sends read commands to the HBM 208 and compares the data returned from HBM 208 with the expected value of 0xAAAAAh as in the conventional approaches described above. Based on the response from device 208, the PHY core finds the data eye and adjusts the delay line for RDQS. The PHY core communicates the read training result to PI 220, and PI 220 will instruct the PHY core to restart the read sequence if the result is not successful.

In step S308, after read training is completed, PI 220 causes IEEE 1500 controller 212 to restore the values of MR7 in registers 214 via interface 218 before releasing the IEEE 1500 IO 218 and DFI 216. The process of read data training is finished by PI 220 generating an interrupt with a flag implying the read training is completed.

Figure 4:
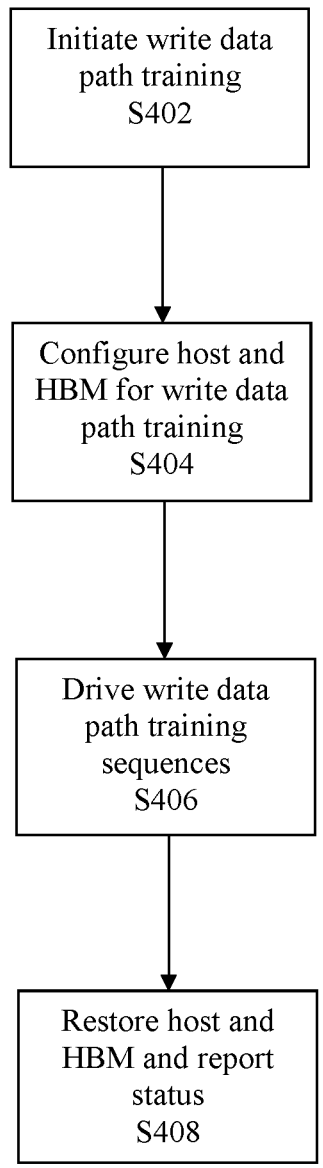
FIG. 4 is a flowchart illustrating an example methodology for performing write data path training for HBMs according to the present embodiments.

FIG. 4 is a flowchart illustrating aspects of an example write data path training methodology for HBMs according to the present embodiments.

In step S402, write data path training is initiated. For example, when host 202 needs write data path training (e.g. when host 202 boots and/or when MC 204 initiates a self-test), MC 204 enables PI 220, for example by setting a register in PI 220. Then PI 220 takes control of DFI 216 (e.g. by requesting control from MC 204). Before giving over control of DFI 216, MC 204 places HBM 208 in self refresh state. PI 220 also requests control of the IEEE 1500 connection 218 from IEEE 1500 controller 212. After this control is acknowledged by controller 212, PI 220 kicks off write data path training.

In step S404, PI 220 sends a series of defined codes to IEEE 1500 controller 212 to cause controller 212 to configure the MR7 register in mode registers 214 via interface 218 so as to place HBM 208 into loopback mode. Also included in step S404, PI 220 further instructs controller 212 to configure mode registers 214 via interface 218 to cause HBM 208 to use MISR registers 210 as the write data destination and read data source.

In step S406, after write data path training configuration, PI 220 drives the DFI write training sequence as described above until the PHY core responds with a training success flag or a time out. More particularly, in response to DFI commands from PI 220, the PHY core sends write and read commands (i.e. sending DWORD write and read cycles) to the HBM 208 and compares the data returned from HBM 208 with the written data as in the conventional approaches described above. Based on the results of the comparisons, the PHY core finds the write data eye and adjusts the delay line for WDQS. The PHY core communicates the write training result to PI 220, and PI 220 will instruct the PHY core to restart the write-read sequences if the result is not successful.

In step S408, after write training is completed, PI 220 causes IEEE 1500 controller 212 to restore the values of MR7 in registers 214 via interface 218 before releasing the IEEE 1500 IO 218 and DFI 216. The process of write data training is finished by PI 220 generating an interrupt with a flag implying the write data path training is completed.

It should be noted that the methodologies of FIGS. 3 and 4 are not necessarily mutually exclusive and may be combined in some embodiments. In other words, embodiments may include performing both read and write data path training with read data path training preferably being performed before write data path training.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A device adapted to be included in a host having a memory controller for accessing data in a high bandwidth memory (HBM) via a read data path and a write data path, the device comprising:
    a module adapted to perform training of one or both of the read data path and the write data path independently from the memory controller,
    wherein the host further includes a memory PHY and a DDR PHY interface (DFI) between the memory controller and the memory PHY, and
    wherein the memory PHY is configured to receive DFI commands for reading and writing data from and to the HBM from the memory controller via the DFI, and
    wherein, responsive to a setting by the memory controller, the module is adapted to independently issue DFI commands to the memory PHY during the training of one or both of the read data path and the write data path.

2. The device of claim 1, wherein the host includes an IEEE 1500 controller adapted to communicate with the HBM via an IEEE 1500 port in the HBM, and wherein the module is adapted to send commands to the HBM for controlling the training of the one or both of the read data path and the write data path via the IEEE 1500 controller.

3. The device of claim 2, wherein the commands include commands to configure mode registers in the HBM used during the training of the one or both of the read data path and the write data path.

4. The device of claim 1, wherein the read data path includes read DQ and RDQS signals and a read DQ data eye and wherein the write data path includes write DQ and WDQS signals and a write DQ data eye, and wherein the training of the read data path includes identifying delays between the RDQS signal and the read DQ data eye to align the RDQS signal to a center of the read DQ data eye, and wherein the training of the write data path includes identifying delays between the WDQS signal and the write DQ data eye to align the WDQS signal to a center of the write DQ data eye.

5. The device of claim 4, wherein the memory PHY includes a PHY core for adjusting delay lines associated with the read clock skew and the write clock skew in accordance with the training performed by the module.

6. The device of claim 1, wherein the HBM comprises LPDDR4 memory.

7. A method for training a read data path between a host and a high bandwidth memory (HBM), the host having a memory controller for accessing data in the HBM via the read data path, the method comprising:
    taking control of an interface between the memory controller and the HBM by a module in the host that is separate from the memory controller; and
    performing training of the read data path by the module independently from the memory controller,
    wherein the host further includes a memory PHY and a DDR PHY interface (DFI) between the memory controller and the memory PHY, and
    wherein the memory PHY is configured to receive DFI commands for reading data from the HBM from the memory controller via the DFI, and
    wherein taking control of the interface includes independently issuing DFI commands from the module to the memory PHY during training of the read data path responsive to a setting by the memory controller.

8. The method of claim 7, wherein performing training by the module includes:
    sending read commands to the HBM; and
    comparing data returned from the HBM with an expected value.

9. The method of claim 7, wherein performing training by the module includes configuring the HBM for read data path training by the module.

10. The method of claim 9, wherein the host includes an IEEE 1500 controller adapted to communicate with the HBM via an IEEE 1500 port in the HBM, and wherein configuring the HBM includes sending commands to the HBM via the IEEE 1500 controller.

11. The method of claim 10, wherein the commands include commands to configure mode registers in the HBM used during the training of the read data path.

12. The method of claim 10, wherein the commands include causing the HBM to enter DWORD register read mode and to use MISR registers in the HBM as the read data source.

13. The method of claim 7, wherein the HBM comprises LPDDR4 memory.

14. A method for training a write data path between a host and a high bandwidth memory (HBM), the host having a memory controller for accessing data in the HBM via the write data path, the method comprising:
    taking control of an interface between the memory controller and the HBM by a module in the host that is separate from the memory controller; and
    performing training of the write data path by the module independently from the memory controller,
    wherein the host includes a memory PHY and a DDR PHY interface (DFI) between the memory controller and the memory PHY, and
    wherein the memory PHY is configured to receive DFI commands for writing data to the HBM from the memory controller via the DFI, and
    wherein taking control of the interface includes independently issuing DFI commands from the module to the memory PHY during training of the write data path responsive to a setting by the memory controller.

15. The method of claim 14, wherein performing training by the module includes:
sending write and read command cycles to the HBM; and
comparing data returned from the HBM with an expected value.

16. The method of claim 15, wherein performing training by the module includes configuring the HBM for write data path training by the module.

17. The method of claim 16, wherein the host includes an IEEE 1500 controller adapted to communicate with the HBM via an IEEE 1500 port in the HBM, and wherein configuring the HBM includes sending commands to the HBM via the IEEE 1500 controller.

18. The method of claim 17, wherein the commands include commands to configure mode registers in the HBM used during the training of the write data path.

19. The method of claim 17, wherein the commands include causing the HBM to enter loopback mode and to use MISR registers in the HBM as the read data source.

20. The method of claim 14, wherein the HBM comprises LPDDR4 memory.

* * * * *